(12) United States Patent
Lee et al.

(10) Patent No.: US 9,350,653 B2
(45) Date of Patent: *May 24, 2016

(54) LABEL SWITCHING IN FIBRE CHANNEL NETWORKS

(71) Applicant: Cisco Technology, Inc., San Jose, CA (US)

(72) Inventors: Scott S. Lee, Campbell, CA (US);
Dinesh G. Dutt, Sunnyvale, CA (US);
Thomas J. Edsall, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/903,580

(22) Filed: May 28, 2013

(65) Prior Publication Data

US 2013/0343397 A1 Dec. 26, 2013

Related U.S. Application Data

(63) Continuation of application No. 12/566,013, filed on Sep. 24, 2009, now Pat. No. 8,462,790, which is a continuation of application No. 10/114,394, filed on Apr. 1, 2002, now Pat. No. 7,616,637.

(51) Int. Cl.
*H04L 12/723* (2013.01)
*H04L 12/46* (2006.01)
*H04L 12/701* (2013.01)
*H04L 12/28* (2006.01)

(52) U.S. Cl.
CPC ............ *H04L 45/50* (2013.01); *H04L 12/4604* (2013.01); *H04L 45/00* (2013.01)

(58) Field of Classification Search
None
See application file for complete search history.

(56) References Cited

U.S. PATENT DOCUMENTS

| | | | |
|---|---|---|---|
| 5,428,471 A | 6/1995 | McDermott |
| 5,506,838 A | 4/1996 | Flanagan |
| 5,617,421 A | 4/1997 | Chin et al. |
| 5,619,497 A | 4/1997 | Gallagher et al. |
| 5,675,741 A | 10/1997 | Aggarwal et al. |
| 5,682,479 A | 10/1997 | Newhall et al. |
| 5,708,659 A | 1/1998 | Rostoker et al. |
| 5,740,159 A | 4/1998 | Ahmad et al. |
| 5,740,171 A | 4/1998 | Mazzola et al. |
| 5,742,604 A | 4/1998 | Edsall et al. |

(Continued)

FOREIGN PATENT DOCUMENTS

| | | |
|---|---|---|
| EP | 0772121 A | 5/1997 |
| EP | 0858036 | 8/1998 |

(Continued)

OTHER PUBLICATIONS

Armitage, Grenville, "MPLS: The Magic Behind the Myths," Jan. 2000, *IEEE Communications Magazine*, pp. 124-131. XP000908346.

(Continued)

*Primary Examiner* — Eunsook Choi
(74) *Attorney, Agent, or Firm* — Polsinelli PC

(57) ABSTRACT

Methods and apparatus are provided for label switched routing in fiber channel networks. Techniques are provided for implementing label switching based on particular characteristics of fiber channel networks. By using label switching, mechanisms such as traffic engineering, security, and tunneling through networks that do not support fiber channel frames can be implemented.

20 Claims, 12 Drawing Sheets

(56) References Cited

U.S. PATENT DOCUMENTS

| | | |
|---|---|---|
| 5,764,636 A | 6/1998 | Edsall |
| 5,781,537 A * | 7/1998 | Ramaswami ............ H04Q 3/66 340/2.1 |
| 5,793,976 A | 8/1998 | Chen et al. |
| 5,805,924 A | 9/1998 | Stoevhase |
| 5,809,285 A | 9/1998 | Hilland |
| 5,818,603 A | 10/1998 | Motoyama |
| 5,819,112 A | 10/1998 | Kusters |
| 5,862,125 A | 1/1999 | Russ |
| 5,959,972 A | 9/1999 | Hamami |
| 5,959,990 A | 9/1999 | Frantz et al. |
| 5,964,841 A | 10/1999 | Rekhter |
| 5,999,930 A | 12/1999 | Wolff |
| 6,035,105 A | 3/2000 | McCloghrie et al. |
| 6,046,985 A | 4/2000 | Aldred |
| 6,101,497 A | 8/2000 | Ofek |
| 6,160,813 A | 12/2000 | Banks et al. |
| 6,188,668 B1 | 2/2001 | Brewer et al. |
| 6,188,694 B1 | 2/2001 | Fine et al. |
| 6,202,135 B1 | 3/2001 | Kedem et al. |
| 6,205,488 B1 | 3/2001 | Casey et al. |
| 6,208,623 B1 | 3/2001 | Rochberger et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,226,771 B1 | 5/2001 | Hilla et al. |
| 6,243,358 B1 | 6/2001 | Monin |
| 6,260,120 B1 | 7/2001 | Blumenau et al. |
| 6,262,977 B1 | 7/2001 | Seaman et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,296 B1 | 9/2001 | Tappan |
| 6,295,575 B1 | 9/2001 | Blumenau et al. |
| 6,310,884 B1 | 10/2001 | Odenwald |
| 6,330,614 B1 | 12/2001 | Aggarwal et al. |
| 6,337,861 B1 | 1/2002 | Rosen |
| 6,388,995 B1 | 5/2002 | Gai et al. |
| 6,401,128 B1 | 6/2002 | Stai et al. |
| 6,408,001 B1 | 6/2002 | Chuah et al. |
| 6,426,952 B1 | 7/2002 | Francis et al. |
| 6,438,612 B1 | 8/2002 | Ylonen et al. |
| 6,473,421 B1 | 10/2002 | Tappan |
| 6,493,349 B1 | 12/2002 | Casey |
| 6,529,963 B1 | 3/2003 | Fredin et al. |
| 6,532,212 B1 | 3/2003 | Soloway et al. |
| 6,535,489 B1 | 3/2003 | Merchant et al. |
| 6,597,663 B1 | 7/2003 | Rekhter |
| 6,604,407 B2 | 8/2003 | Kano |
| 6,643,287 B1 | 11/2003 | Callon et al. |
| 6,661,773 B1 | 12/2003 | Pelissier et al. |
| 6,674,760 B1 | 1/2004 | Walrand et al. |
| 6,728,220 B2 | 4/2004 | Behzadi |
| 6,728,848 B2 | 4/2004 | Tamura et al. |
| 6,766,482 B1 | 7/2004 | Yip et al. |
| 6,775,230 B1 | 8/2004 | Watanabe et al. |
| 6,804,776 B1 | 10/2004 | Lothberg et al. |
| 6,848,007 B1 | 1/2005 | Reynolds et al. |
| 6,859,435 B1 | 2/2005 | Lee et al. |
| 6,879,560 B1 | 4/2005 | Cahn |
| 6,904,053 B1 | 6/2005 | Berman |
| 6,915,358 B2 * | 7/2005 | Horton et al. .................. 710/30 |
| 6,920,133 B1 | 7/2005 | Boodaghians |
| 6,920,153 B2 | 7/2005 | Ellis et al. |
| 6,920,154 B1 | 7/2005 | Achler |
| 6,947,379 B1 | 9/2005 | Gleichauf et al. |
| 6,959,151 B1 | 10/2005 | Cotter et al. |
| 6,975,589 B2 | 12/2005 | Luft et al. |
| 6,985,490 B2 | 1/2006 | Czeiger et al. |
| 6,993,593 B2 | 1/2006 | Iwata |
| 7,006,525 B1 * | 2/2006 | Jha .................. 370/466 |
| 7,026,288 B2 | 4/2006 | Judice et al. |
| 7,027,406 B1 | 4/2006 | Shabtay et al. |
| 7,046,679 B2 | 5/2006 | Sampath |
| 7,050,392 B2 | 5/2006 | Valdevit |
| 7,054,304 B2 | 5/2006 | Wang |
| 7,061,858 B1 | 6/2006 | Di Benedetto et al. |
| 7,072,298 B2 | 7/2006 | Paul et al. |
| 7,076,594 B2 | 7/2006 | Benedetto et al. |
| 7,079,544 B2 | 7/2006 | Wakayama et al. |
| 7,082,140 B1 * | 7/2006 | Hass ............................ 370/466 |
| 7,085,846 B2 | 8/2006 | Jenne et al. |
| 7,155,494 B2 | 12/2006 | Czeiger et al. |
| 7,161,935 B2 | 1/2007 | Alonso et al. |
| 7,180,909 B1 * | 2/2007 | Achler ................ H03M 7/3084 370/466 |
| 7,206,288 B2 | 4/2007 | Cometto et al. |
| 7,216,158 B2 | 5/2007 | Revanuru et al. |
| 7,221,652 B1 | 5/2007 | Singh et al. |
| 7,275,103 B1 | 9/2007 | Thrasher et al. |
| 7,301,898 B1 | 11/2007 | Martin et al. |
| 7,302,494 B2 | 11/2007 | Hayashi et al. |
| 7,319,669 B1 | 1/2008 | Kunz et al. |
| 7,328,260 B1 | 2/2008 | Muthiyan et al. |
| 7,330,892 B2 | 2/2008 | Ibrahim |
| 7,355,983 B2 | 4/2008 | Scudder et al. |
| 7,366,194 B2 | 4/2008 | Yu et al. |
| 7,376,755 B2 | 5/2008 | Pandya |
| 7,406,034 B1 | 7/2008 | Cometto et al. |
| 7,433,326 B2 | 10/2008 | Desai et al. |
| 7,443,799 B2 | 10/2008 | Varanasi et al. |
| 7,447,224 B2 | 11/2008 | Dropps |
| 7,499,410 B2 | 3/2009 | Dutt et al. |
| 7,586,947 B2 | 9/2009 | Miki et al. |
| 7,593,324 B2 | 9/2009 | Jain et al. |
| 7,599,360 B2 | 10/2009 | Edsall et al. |
| 7,616,637 B1 | 11/2009 | Lee et al. |
| 7,649,844 B2 | 1/2010 | Bector et al. |
| 7,830,809 B2 | 11/2010 | Cometto et al. |
| 7,876,711 B2 | 1/2011 | Dutt et al. |
| 7,916,628 B2 | 3/2011 | Ghosh et al. |
| 8,060,630 B1 | 11/2011 | Jancaitis et al. |
| 8,605,624 B2 * | 12/2013 | Desai et al. .................... 370/255 |
| 2001/0020254 A1 | 9/2001 | Blumenau et al. |
| 2001/0049739 A1 | 12/2001 | Wakayama et al. |
| 2002/0009081 A1 | 1/2002 | Sampath et al. |
| 2002/0018269 A1 * | 2/2002 | Chaudhuri .......... H04J 14/0227 398/166 |
| 2002/0034178 A1 | 3/2002 | Schmidt et al. |
| 2002/0075873 A1 | 6/2002 | Lindhorst-Ko et al. |
| 2002/0085493 A1 | 7/2002 | Pekkala et al. |
| 2002/0101868 A1 | 8/2002 | Clear et al. |
| 2002/0110125 A1 | 8/2002 | Banks et al. |
| 2002/0133740 A1 | 9/2002 | Oldfield et al. |
| 2002/0150039 A1 | 10/2002 | Valdevit et al. |
| 2002/0152338 A1 | 10/2002 | Elliott et al. |
| 2002/0156918 A1 * | 10/2002 | Valdevit et al. ............... 709/238 |
| 2002/0156924 A1 | 10/2002 | Czeiger et al. |
| 2002/0176434 A1 | 11/2002 | Yu et al. |
| 2002/0188754 A1 | 12/2002 | Foster et al. |
| 2003/0012204 A1 | 1/2003 | Czeiger et al. |
| 2003/0016624 A1 | 1/2003 | Bare |
| 2003/0067925 A1 | 4/2003 | Choe et al. |
| 2003/0084219 A1 | 5/2003 | Yao et al. |
| 2003/0101239 A1 | 5/2003 | Ishizaki |
| 2003/0107987 A1 | 6/2003 | Kinstler |
| 2003/0118053 A1 * | 6/2003 | Edsall ................ H04L 12/4641 370/474 |
| 2003/0142628 A1 | 7/2003 | Alonso et al. |
| 2003/0145116 A1 | 7/2003 | Moroney et al. |
| 2003/0149848 A1 | 8/2003 | Ibrahim et al. |
| 2003/0163727 A1 | 8/2003 | Hammons et al. |
| 2003/0189929 A1 | 10/2003 | Matsuzaki et al. |
| 2003/0198247 A1 | 10/2003 | Gardner et al. |
| 2003/0208618 A1 | 11/2003 | Mor et al. |
| 2004/0028060 A1 | 2/2004 | Kang |
| 2004/0085908 A1 | 5/2004 | Balasubramanian et al. |
| 2004/0100910 A1 | 5/2004 | Desai et al. |
| 2004/0151174 A1 | 8/2004 | Del Signore et al. |
| 2004/0151188 A1 | 8/2004 | Maveli et al. |
| 2004/0210656 A1 | 10/2004 | Beck et al. |
| 2004/0230787 A1 | 11/2004 | Blumenau et al. |
| 2004/0233921 A1 | 11/2004 | Krieg et al. |
| 2005/0018606 A1 | 1/2005 | Dropps |

(56) References Cited

U.S. PATENT DOCUMENTS

| | | |
|---|---|---|
| 2005/0018663 A1 | 1/2005 | Dropps |
| 2005/0018701 A1 | 1/2005 | Dropps |
| 2005/0025075 A1 | 2/2005 | Dutt et al. |
| 2005/0036499 A1 | 2/2005 | Dutt et al. |
| 2005/0080903 A1 | 4/2005 | Valenci |
| 2005/0088969 A1 | 4/2005 | Carlsen et al. |
| 2005/0108444 A1 | 5/2005 | Flauaus |
| 2005/0117562 A1 | 6/2005 | Wrenn |
| 2005/0169188 A1 | 8/2005 | Cometto et al. |
| 2005/0177634 A1 | 8/2005 | Scudder et al. |
| 2005/0249123 A1 | 11/2005 | Finn |
| 2005/0267965 A1 | 12/2005 | Heller |
| 2006/0034302 A1 | 2/2006 | Peterson |
| 2006/0038263 A1 | 2/2006 | Eigner et al. |
| 2006/0087963 A1 | 4/2006 | Jain et al. |
| 2006/0092932 A1 | 5/2006 | Ghosh et al. |
| 2006/0117212 A1 | 6/2006 | Meyer et al. |
| 2006/0153186 A1 | 7/2006 | Bector et al. |
| 2006/0159081 A1 | 7/2006 | Dropps |
| 2007/0153816 A1 | 7/2007 | Cometto et al. |
| 2008/0028096 A1 | 1/2008 | Henderson et al. |
| 2008/0316942 A1 | 12/2008 | Desai et al. |
| 2009/0141657 A1 | 6/2009 | Dutt et al. |
| 2010/0008375 A1 | 1/2010 | Lee et al. |
| 2011/0090816 A1 | 4/2011 | Dutt et al. |
| 2011/0141906 A1 | 6/2011 | Ghosh et al. |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 08111693 | 4/1996 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| KR | 2001-0083215 | 1/2001 |
| WO | WO00/31925 | 6/2000 |
| WO | WO01/19027 | 3/2001 |
| WO | WO01/69834 | 9/2001 |
| WO | WO01/95565 | 12/2001 |
| WO | WO02/71224 | 12/2002 |

OTHER PUBLICATIONS

ATM Forum Committee, Chapter 10, "Flush Message Protocol Procedures and Frame Formats," *Lan Emulation Over ATM Version 2—LUNI Specification*, AF-Lane-0084.000, Jul. 1997, pp. 111-115.
Brocade Communication Systems, Inc. "Increasing Intelligence with the SAN Fabric", White paper, Online!, Jun. 2001 XP002251362.
Brocade Communication Systems, Inc. "Optimizing the performance and management of 2Gbit/sec SAN fabrics with ISL trunking", White paper, Online!, Mar. 2002.
Charles Monia: "iFCP—A Protocol for Internet Fibre Channel Storage Networking" Nishan Systems, 'Online!, Dec. 12, 2000, XP002246205.
Cisco Systems, "Cisco MDS 9000 Family of Multilayer Directors and Fabric Switches", 1992-2003 Cisco Systems, Inc., pp. 1-4.
Cisco Systems, "Cisco SAN-OS Reference Guide", 1992-2004 Cisco Systems, Inc. pp. 1-13.
Cisco Systems, "Cisco SAN-OS", 1992-2003 Cisco Systems, Inc. pp. 1-7.
Claudio DeSanti, "Extended_Headers", VF N_Port Model, T11/04-627v1, Oct. 2004, 1 page.
Claudio DeSanti, "Virtual Fabrics N_Port Support", VF N_Support, T11/04-494v2, Oct. 2004, 14 pages.
Claudio DeSanti, "Virtual Fabrics N_Port Support", VF N_Support, T11/04-49v0, Jul. 2004, 13 pages.
Claudio DeSanti, "Virtual Fabrics Switch Support", VF Switch Support, T11/04-395v3, Oct. 2004, 15 pages.
Claudio DeSanti, "Virtual Fabrics", T11/03-220v0, PowerPoint presentation, Apr. 2003, 11 pages.
D. Mills, Network Working Group Request for Comments 1059, Network Time Protocol (Version 1) Specifiction and Implementation, University of Delaware, Jul. 1988, pp. 1-50.
D1: Yasumori Takizawa, "Technology Scope IP Storage Disk Divided by IP Network Wide Area Ethernet Encouraging the Same," *Nikkei Communication*, Mar. 4, 200, No. 361, pp. 106-113.
D2: Glenn Sullivan, "Building of Long Distance SAN", *UNIX Magazine*, Apr. 1, 2000, vol. 15, No. 4, pp. 133-137.
D4: Fujita et al., "SSE98-225 QoS Control Using MPLS over ATM," *Technical Report of IEICE*, Mar. 19, 1999, vol. 98, No. 668, pp. 81-86.
DeSanti et al., "Tagged Frame Specification," Tagged Frame Spec., T11/03-353v0, May 2003, 4 pages.
Ezio Valdevit, http://t11.org/index.htm, "Fabric Shortest Path First Version (FSPF) Rv. 0.2", Fabric shortest Path, May 23, 2000 XP002959525.
Fibre Channel Generic Services-3 (FC-GS-3), NCITS working draft, Nov. 28, 2000.
"Fibre Channel Switch Fabric-2 (FC-SW-2)", NCITS working draft, Jun. 26, 2001.
"Fibre Channel Switch Fabric-3 (FC-SW-3)", NCITS working draft, Feb. 19, 2003. XP002300830 (A,B,C).
Guan et al., Inter-fabric FC Architecture, May 30, 2003, Brocade—The Intelligent Platform for Network Storage.
http://t11/org/index.htm, Fabric Shortest Path First (FSPF) Project 1508-D Switch Fabric-3 Rev. 6.5, Oct. 31, 2003, pp. 117-140.
IEEE Std 802.3-2002, Chapter 43.5 Marker Protocol, *Part 3: Carrier Sense Multiple Access with Collision Detection (CSMA/CD) Access Method and Physical Layer Specifications*, 2002, pp. 329-345.
K. White, IBM Corp, RFC 2925, Sep. 2000.
Kiiskilä, Marko, "Implementation of LAN Emulation of ATM in Linux," *Tampereen Teknillinen Korkeakoulu*, Oct. 1996, 57 pages.
Listanti et al., "Architectural and Technological Issues for Future Optical Internet Networks", Optical Solutions for Next-Generation Internet Networks, *IEEE Communication Magazine*, Sep. 2000.
M. Rajagopal, R. et al., "Fibre Channel Over TCP/IP" DRAFT-IETF-IPS-FCOVERTCPIP-06.TXT, Mar. 1, 2002, pp. 1-46, XP015021184.
M. Rajagopal, R. et al., "IP and ARP Over Fibre Channel" Request for Comments: 2625, 'Online!, Jun. 30, 1999, XP002246207.
Mearian et al., "What's After Fibre Channel?", Computerworld, Online!, Oct. 15, 2001, XP002246206.
Molero et al., "On the effect of link failure in fibre channel sotrage area networks", Parallel Architectures, Algorithms and Networks 2000, I-Span 2000 Proceedings, Int'l Symposium, Dec. 7-9, 2000.
Monia et al., "iFCP—A Protocol for Internet Fibre Channel Storage Networking" Feb. 2002.
Monia, et al., "iFCP—A Protocol for Internet Fibre Channel Storage", DRAFT-MONIA-IPS-IFCP-01.TXT, Jan. 1, 2001, pp. 1-48, XP01502633.
Rosen et al., "Multiprotocol Label Switching Architecture", Network working group, RFC 3031, Jan. 2001 XP002251364.
VenKat Rangan: "Re: FCIP/1FCP: Gurantee In-Order delivery for FC N/NL_ports", IP Storage—Mailing List Archive, Online! http://www.pdl.cmu/edu/mailinglists/ips/mail/msg03069.html Sep. 4, 2001.
White Paper, Link Aggregation According to IEEE Standard 802.3ad, Oct. 10, 2002, v.1.10, pp. 1-21.
PCT International Search Report mailed May 23, 2003 from PCT/US02/41072.
International Preliminary Examination Report dated Aug. 7, 2003 issued to PCT/US02/41072.
PCT International Search Report mailed Oct. 17, 2003 issued to PCT/US03/09328.
PCT International Search Report mailed Jul. 15, 2003 from corresponding PCT Application No. PCT/US03/09442.
PCT International Search Report mailed Nov. 4, 2003 from corresponding PCT Application No. PCT/US03/18765.
PCT International Search Report mailed Jul. 12, 2004 from PCT Application No. PCT/US03/36452.

(56) References Cited

OTHER PUBLICATIONS

PCT International Search Report dated Oct. 27, 2004 from corresponding PCT/US2004/020518.
PCT Written Opinion dated Oct. 27, 2004 from corresponding PCT/US2004/020518.
International Preliminary Report on Patentability dated Jan. 12, 2006 from corresponding PCT Application No. PCT/US2004/020518.
PCT International Search Report mailed Oct. 25, 2006 from PCT Application No. PCT/US05/37763.
PCT Written Opinion mailed Oct. 25, 2006 from PCT Application No. PCT/US05/37763.
PCT International Preliminary Report on Patentability dated May 10, 2007 from PCT/US05/037763.
PCT International Preliminary Report on Patentability dated Dec. 29, 2004 from PCT/US05/044726.
AU Office Action dated Mar. 16, 2007 for Australian Application No. 2002364204.
AU Office Action dated May 30, 2007 for Australian Application No. 2003226022.
AU Office Action dated May 23, 2007 for Australian Application No. 2003226093.
AU Office Action dated Oct. 4, 2007 for Australian Application No. 2003245492.
AU Examiner's Report dated Jul. 14, 2008 for Australian Patent Application No. 2003296301.
AU Office Action dated Sep. 26, 2008 for Australian Application No. 20043000680.
CA Office Action dated Aug. 13, 2008 for Canadian Application No. 2,472,056.
CA Second Office Action dated Apr. 28, 2009 for Canadian Application No. 2,472,056.
CA Office Action dated Jan. 30, 2008 for Canadian Application No. 2,480,461.
CA Office Action dated Aug. 13, 2008 for Canadian Application No. 2,480,462.
CA Second Office Action dated May 11, 2009 for Canadian Application No. 2,480,462.
CA Third Office Action dated Feb. 8, 2010 for Canadian Application No. 2,480,462.
CA Office Action dated Jun. 15, 2006 for Canadian Application No. 2,487,071.
CA First Office Action for Canadian Application No. 2,521,463 dated Sep. 24, 2008.
CA Second Office Action dated Jun. 17, 2009 for Canadian Application No. 2,521,463.
CA Third Office Action dated Apr. 30, 2010 for Canadian Application No. 2,521,463.
CN Office Action dated Dec. 1, 2006 for Application No. 02828262.0.
CN Office Action dated Mar. 7, 2008 for Application No. 03807560.1.
CN Office Action dated Dec. 26, 2008 for Application No. 03807560.1.
CN Office Action mailed Sep. 8, 2006 for Application No. 03807600.4.
CN Second Office Action mailed May 8, 2009 for Application No. 03807600.4.
CN Third Office Action mailed Aug. 28, 2009 for Application No. 03807600.4.
CN Fourth Office Action mailed Feb. 5, 2010 for Application No. 03807600.4.
CN Office Action dated Jun. 22, 2007 for Application No. 03813264.8.
CN Second Office Action dated Oct. 16, 2009 for Application No. 03813264.8.
CN Office Action dated Sep. 5, 2008 for Application No. 200380104466.6.
CN Second Office Action dated Apr. 24, 2009 for Application No. 200380104466.6.
CN Third Office Action dated Nov. 20, 2009 for Application No. 200380104466.6.
CN Office Action dated Oct. 19, 2007 for Application No. 200480010826.0.
CN Second Office Action dated Nov. 7, 2008 for Application No. 200480010826.0.
CN Office Action dated Dec. 21, 2010 for Application No. 201010141491.3.
CN Office Action dated Jun. 19, 2011 for Application No. 201010141491.3.
CN Office Action dated Jun. 6, 2008 for Application No. 20058003410.x.
EP Office Action dated Jan. 18, 2005 for EP Application No. 02799279.1-1525.
EP Office Action dated Oct. 18, 2005 for EP Application No. 02799279.1-1525.
EP Office Action dated Feb. 20, 2006 for EP Application No. 02799279.1-1525.
EP Office Action dated May 30, 2006 for EP Application No. 02799279.1-1525.
EP Office Action dated Feb. 10, 2006, from EP Application No. 03746053.2-2416.
EP Office Action dated Mar. 28, 2007 from EP Application No. 03746053.2-2416.
EP Office Action dated Oct. 1, 2007 from EP Application No. 03746053.2-2416.
EP Office Action dated Oct. 8, 2009 from EP Application No. 03746053.2-2416.
EP Search Report dated May 19, 2005 from EP Application No. 03 746062.3-1249.
EP Office Action dated Feb. 9, 2010 from EP Application No. 03 746062.3-1249.
EP Office Action dated Dec. 16, 2010 from EP Application No. 03 746062.3-1249.
EP Office Action dated Apr. 5, 2006 from EP Application No. 03 739 127.3-2416.
EP Office Action mailed Nov. 6, 2007 for EP Application No. 03789766.7.
EP Office Action mailed Jan. 26, 2012 for EP Application No. 04756162.6.
EP Office Action mailed Mar. 10, 2011 for EP Application No. 05810274.0.
EP Search Report dated Sep. 9, 2011 from EP Application No. 05853608.7.
JP Office Action dated May 19, 2008 for Japanese Application No. 2003-559086.
JP Office Action dated Jun. 2, 2008 for Japanese Application No. 2003-582973.
JP Office Action mailed Dec. 22, 2008 for Japanese Application No. 2003-582973.
JP Office Action mailed Jul. 27, 2009 for Japanese Application No. 2003-582973.
JP Office Action mailed May 12, 2008 for Japanese Application No. 2003-582964.
JP Final Office Action mailed May 25, 2009 for Japanese Application No. 2003-582964.
JP Office Action mailed Apr. 4, 2011 for Japanese Application No. 2009-221174.
KR Notification of Provisional Rejection dated Apr. 15, 2009 issued for KR Patent Application No. 2004-7010143 as stated in the letter from Kim and Cho dated Apr. 23, 2009.
KR Notification of Provisional Rejection dated Sep. 18, 2009 issued for KR Patent Application No. 2004-7015587 as stated in the letter from Kim and Cho dated Sep. 29, 2009.
KR Notification of Provisional Rejection dated Oct. 22, 2009 for Application No. 2004-7015583 as stated in the letter from Kim and Cho dated Oct. 28, 2009.
U.S. Non-Final Office Action dated Aug. 22, 2005 from U.S. Appl. No. 10/034,160.
U.S. Final Office Action dated Dec. 13, 2005 from U.S. Appl. No. 10/034,160.
U.S. Non-Final Office Action dated May 31, 2006 from U.S. Appl. No. 10/034,160.

(56) References Cited

OTHER PUBLICATIONS

U.S. Non-Final Office Action dated Sep. 26, 2006 from U.S. Appl. No. 10/034,160.
U.S. Final Office Action dated Feb. 5, 2007 from U.S. Appl. No. 10/034,160.
U.S. Non-Final Office Action dated Jul. 30, 2007 from U.S. Appl. No. 10/034,160.
U.S. Final Office Action dated Jan. 29, 2008 from U.S. Appl. No. 10/034,160.
U.S. Non-Final Office Action dated Nov. 19, 2008 from U.S. Appl. No. 10/034,160.
U.S. Notice of Allowance dated May 29, 2009 from U.S. Appl. No. 10/034,160.
U.S. Office Action dated May 22, 2006 from U.S. Appl. No. 10/114,568.
U.S. Office Action dated Oct. 23, 2006 from U.S. Appl. No. 10/114,568.
U.S. Office Action dated Apr. 6, 2007 from U.S. Appl. No. 10/114,568.
U.S. Final Office Action dated Sep. 20, 2007 from U.S. Appl. No. 10/114,568.
U.S. Notice of Allowance mailed Mar. 26, 2008 from U.S. Appl. No. 10/114,568.
U.S. Office Action dated Oct. 17, 2006 from U.S. Appl. No. 10/114,394.
U.S. Final Office Action mailed Apr. 4, 2007 from U.S. Appl. No. 10/114,394.
U.S. Office Action dated Aug. 22, 2007 from U.S. Appl. No. 10/114,394.
U.S. Office Action mailed Feb. 6, 2008 from U.S. Appl. No. 10/114,394.
U.S. Final Office Action mailed Aug. 21, 2008 from U.S. Appl. No. 10/114,394.
U.S. Office Action mailed Mar. 23, 2009 from U.S. Appl. No. 10/114,394.
U.S. Notice of Allowance dated Jun. 25, 2009 from U.S. Appl. No. 10/114,394.
U.S. Non-Final Office Action dated Oct. 1, 2010, from U.S. Appl. No. 12/566,013.
U.S. Final Office Action dated Apr. 1, 2011, U.S. Appl. No. 12/566,013.
U.S. Office Action dated Oct. 28, 2011, U.S. Appl. No. 12/566,013.
U.S. Office Action dated May 22, 2006 from U.S. Appl. No. 10/170,855.
U.S. Notice of Allowance issued Dec. 6, 2006 from U.S. Appl. No. 10/170,855.
U.S. Notice of Allowance issued Jul. 7, 2010 from U.S. Appl. No. 11/713,341.
U.S. Office Action dated Feb. 23, 2007 from U.S. Appl. No. 10/430,491.
U.S. Final Office Action dated Aug. 9, 2007 from U.S. Appl. No. 10/430,491.
U.S. Notice of Allowance dated Nov. 23, 2007 from U.S. Appl. No. 10/430,491.
U.S. Notice of Allowance dated Apr. 23, 2008 from U.S. Appl. No. 10/430,491.
U.S. Notice of Allowance dated Aug. 8, 2008 from U.S. Appl. No. 10/430,491.
U.S. Supplemental Notice of Allowance dated Aug. 26, 2008 from U.S. Appl. No. 10/430,491.
U.S. Allowed claims (Aug. 8, 2008) from U.S. Appl. No. 10/430,491.
U.S. Office Action dated Aug. 18, 2009 from U.S. Appl. No. 12/202,004.
U.S. Office Action dated Feb. 17, 2010 from U.S. Appl. No. 12/202,004.
U.S. Office Action dated Dec. 6, 2011 from U.S. Appl. No. 12/202,004.
U.S. Final Office Action dated May 3, 2012 from U.S. Appl. No. 12/202,004.
U.S. Notice of Allowance dated Apr. 15, 2013 from U.S. Appl. No. 12/202,004.
U.S. Notice of Allowance (supplemental) dated May 21, 2013 from U.S. Appl. No. 12/202,004.
U.S. Office Action dated Mar. 28, 2007 U.S. Appl. No. 10/609,442.
U.S. Final Office Action dated Sep. 5, 2007 from U.S. Appl. No. 10/609,442.
U.S. Office Action dated Mar. 28, 2008 from U.S. Appl. No. 10/609,442.
U.S. Notice of Allowance dated Sep. 26, 2008 from U.S. Appl. No. 10/609,442.
U.S. Office Action dated Apr. 28, 2010, from U.S. Appl. No. 12/343,843.
Notice of Allowance dated Sep. 20, 2010, from U.S. Appl. No. 12/343,843.
U.S. Office Action dated Sep. 10, 2007 from U.S. Appl. No. 10/974,368.
U.S. Notice of Allowance dated May 1, 2008 from U.S. Appl. No. 10/974,368.
U.S. Office Action dated Sep. 12, 2008 from U.S. Appl. No. 10/974,368.
U.S. Notice of Allowance dated Feb. 13, 2009 from U.S. Appl. No. 10/974,368.
U.S. Notice of Allowance dated Apr. 21, 2009 from U.S. Appl. No. 10/974,368.
U.S. Office Action dated May 13, 2008 from U.S. Appl. No. 10/979,886.
U.S. Office Action dated Nov. 25, 2008 from U.S. Appl. No. 10/979,886.
U.S. Office Action dated Jul. 10, 2009 from U.S. Appl. No. 10/979,886.
U.S. Office Action dated Jan. 29, 2010 from U.S. Appl. No. 10/979,886.
Notice of Allowance dated Jul. 26, 2010 from U.S. Appl. No. 10/979,886.
Notice of Allowance dated Nov. 19, 2010 from U.S. Appl. No. 10/979,886.
U.S. Office Action dated Oct. 24, 2012 from U.S. Appl. No. 13/031,013.
U.S. Office Action mailed Oct. 29, 2007 from U.S. Appl. No. 11/027,252.
U.S. Final Office Action mailed Aug. 7, 2008 from U.S. Appl. No. 11/027,252.
U.S. Office Action mailed Dec. 12, 2008 from U.S. Appl. No. 11/027,252.
U.S. Notice of Allowance mailed Jun. 26, 2009 from U.S. Appl. No. 11/027,252.
U.S. Notice of Allowance mailed Nov. 9, 2009 from U.S. Appl. No. 11/027,252.
U.S. Notice of Allowance mailed Feb. 8, 2013, U.S. Appl. No. 12/566,013.
U.S. Office Action dated Sep. 25, 2012 for U.S. Appl. No. 12/975,072.
U.S. Office Action dated Apr. 10, 2013 for U.S. Appl. No. 12/975,072.
U.S. Office Action dated Apr. 10, 2013 from U.S. Appl. No. 13/031,013.

\* cited by examiner

| LSR4 Routing Table | | | |
|---|---|---|---|
| In Label | Dest Id | Nxt Hop | Out Label |
| 2000 | Switch 2 | Switch 43 | 3000 |
| 2002 | Switch 53 | Switch 23 | 3004 |
| 2004 | Switch 27 | Switch 23 | 3008 |

301   303   305   307

LABEL SWITCHING IN FIBRE CHANNEL NETWORKS

CROSS-REFERENCE TO RELATED APPLICATIONS

The present application is a continuation of, and claims priority under 35 U.S.C. §120 to, U.S. patent application Ser. No. 12/566,013, by Scott S. Lee, Dinesh G. Dutt, and Thomas J. Edsall, filed Sep. 24, 2009, issued as U.S. Pat. No. 8,462,790, which is a continuation of U.S. patent application Ser. No. 10/114,394 by Scott S. Lee, Dinesh G. Dutt, and Thomas J. Edsall, filed Apr. 1, 2002, which has issued as U.S. Pat. No. 7,616,637. The entirety of U.S. patent application Ser. No. 12/566,013 and U.S. patent application Ser. No. 10/114,394 are incorporated in their entirety by reference herein for all purposes.

BACKGROUND OF THE INVENTION

1. Field of the Invention

The present invention relates to fibre channel networks. More specifically, the present invention relates to methods and apparatus for label switching in fibre channel networks.

2. Description of Related Art

In connectionless networks such as packet-switched networks, label switching has conventionally been used to allow for various features. However, it has been difficult to extend label switching into fibre channel network because of particular characteristics of fibre channel networks.

It is therefore desirable to provide methods and apparatus for using label switching in fibre channel networks not only to allow faster access to routing table entries, but also to generally improve fibre channel frame delivery.

SUMMARY OF THE INVENTION

Methods and apparatus are provided for label switched routing in fibre channel networks. Techniques are provided for implementing label switching based on particular characteristics of fibre channel networks. By using label switching, mechanisms such as traffic engineering, security, and tunneling through networks that do not support fibre channel frames can be implemented.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Methods and apparatus of the present invention provide for label switching of fibre channel frames. According to various embodiments, fibre channel frames include label stacks that allow fibre channel frames to be tunneled through networks that do not support fibre channel frames and rerouted around downed links. Fibre channel frames can also be delivered in order using label switching.

In a typical connectionless fibre channel network such as a class two or class three fibre channel network, a packet travels from one network entity to the next network entity based on an independent forwarding decision at each switch. The next hop for a frame is determined based on information including a destination address in the frame header. In a label switching domain, however, label switching routers make forwarding decisions based not on the destination address in the frame header but instead based on label information associated with a frame. No analysis of the packet header or frame header is needed at each hop.

Instead, the label in the packet or frame is used to index an entry in a forwarding table that contains the next hop information and a set of one or more new labels to be used as the packet is forwarded. The next hop can then use a new label to forward the frame. Although label switching was originally developed in TCP/IP networks to simplify access to routing table entries, the techniques of the present invention contemplate using label switching in fibre channel networks to enable features such has traffic engineering, tunneling, and in order delivery in addition to facilitating routing table access. Label switching as Multiprotocol Label Switching (MPLS) for IP networks is described in RFC 3031.

Several obstacles prevent the implementation of label switching in fibre channel networks. One obstacle is that some fibre channel devices require that fibre channel frames be delivered in order. Label switching used in TCP/IP networks often can deliver packets out of order. However, network entities in TCP/IP networks can handle out of order packets. Destination nodes typically reorder packets received out of sequence. Some fibre channel devices, however, can not handle out of order frames. Furthermore, fibre channel frames do not have a mechanism for carrying labels.

Figure 1:
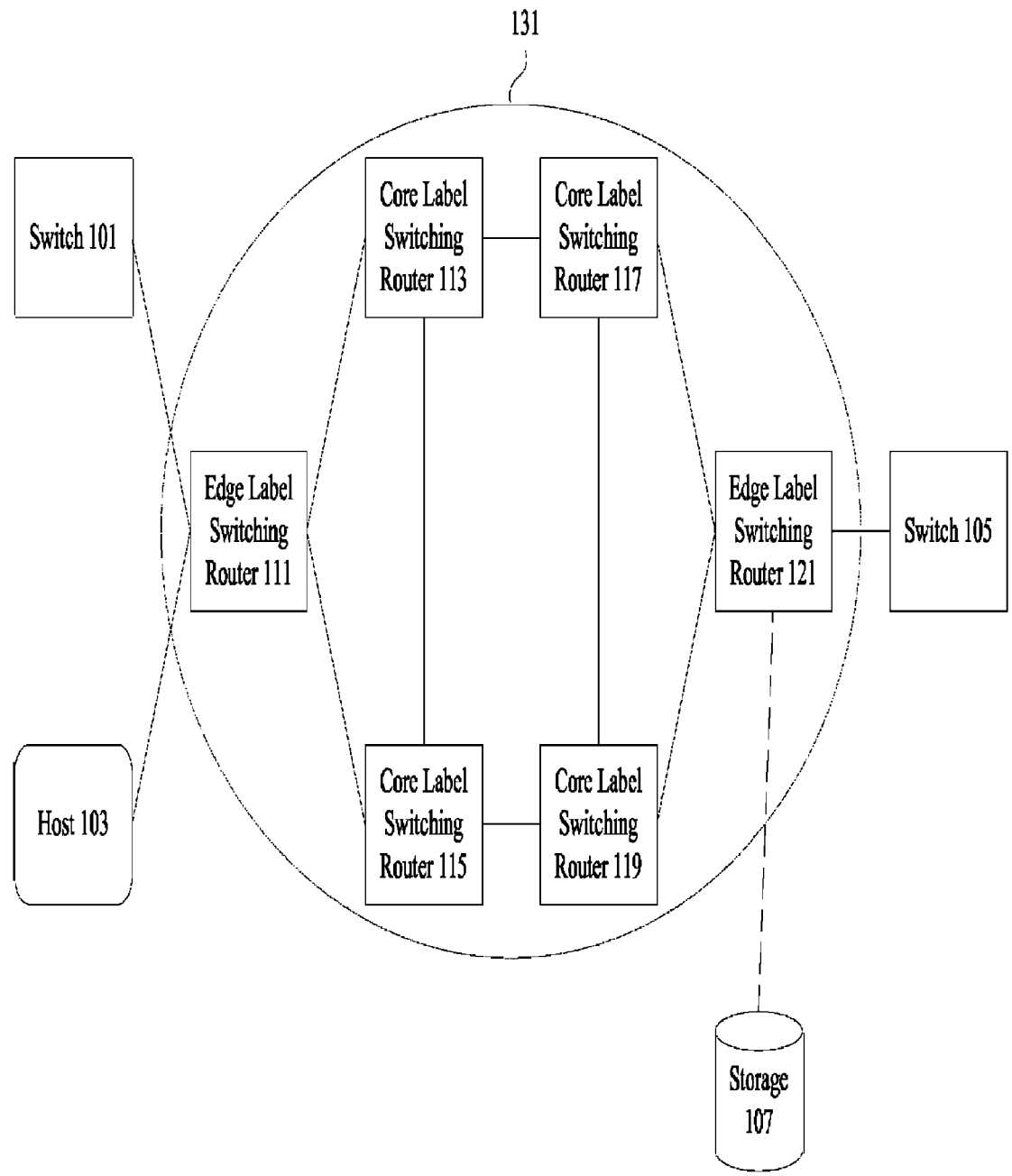
FIG. 1 is a diagrammatic representation of a network that can use the techniques of the present invention.

FIG. 1 is a diagrammatic representation of the network that can use the techniques of the present invention. According to various embodiments, a label switching domain 131 includes edge label switching routers 111 and 121, and core label switching routers 113, 115, 117, and 119. An interconnected set of network entities that support label switching for forwarding frames is referred to herein as a label switching domain. A switch that is outside the label switching domain 131 can use conventional techniques for accessing routing table entries and forwarding frames. In one example, a switch 101 may send a frame without a label to a label switching router 111. Without label switching, a label switching router 111 typically uses the destination address provided in the frame to identify a next hop for the frame. The next hop then similarly accesses the destination address and determine the subsequent hop based on the destination address to continue forwarding the frame until the frame finally reaches the destination.

Using label switching however, an edge label switching router 111 adds a label to the frame from switch 101. The label can then be used at a subsequent hop, core label switching router 113, to access a routing table to again determine where to transmit the frame. Instead of using the destination address at router 113, a label is used at router 113 to access a forwarding entry. When a label switching router is connected to a label unaware switch, the label switching router is referred to herein as an edge label switching router. Any device that does not support the use of labels for forwarding decisions is referred to herein as a label unaware switch. The edge label switching router can be an ingress label switching router when it handles traffic entering into the label switching domain. The edge label switching router can be an egress label switching router when it handles traffic leaving the label switching domain. In one example where a frame is transmitted from switch 101 to switch 105, edge label switching router 111 would be the ingress label switching router while edge label switching router 121 would be the egress label switching router. It should be noted that some label switching routers could be core and edge label switching routers.

The label switching routers connected to other label switching enabled routers are referred to herein as core label switching routers. According to various embodiments, all the incoming packets or frames received at core label switching routers include labels. Consequently, core label switching routers only need to look at the incoming label in order to make the forwarding decision. According to other embodiments, some incoming packets or frames received at a core label switching router do not include labels. Consequently, some packets and frames are switched without the use of labels.

It should be noted that a switch can be both a core label switching router and an edge label switching router. Edge label switching router 121 is connected to label switching router 117 and 119 while it is connected to label unaware router 105 and label unaware storage device 107.

Figure 2:
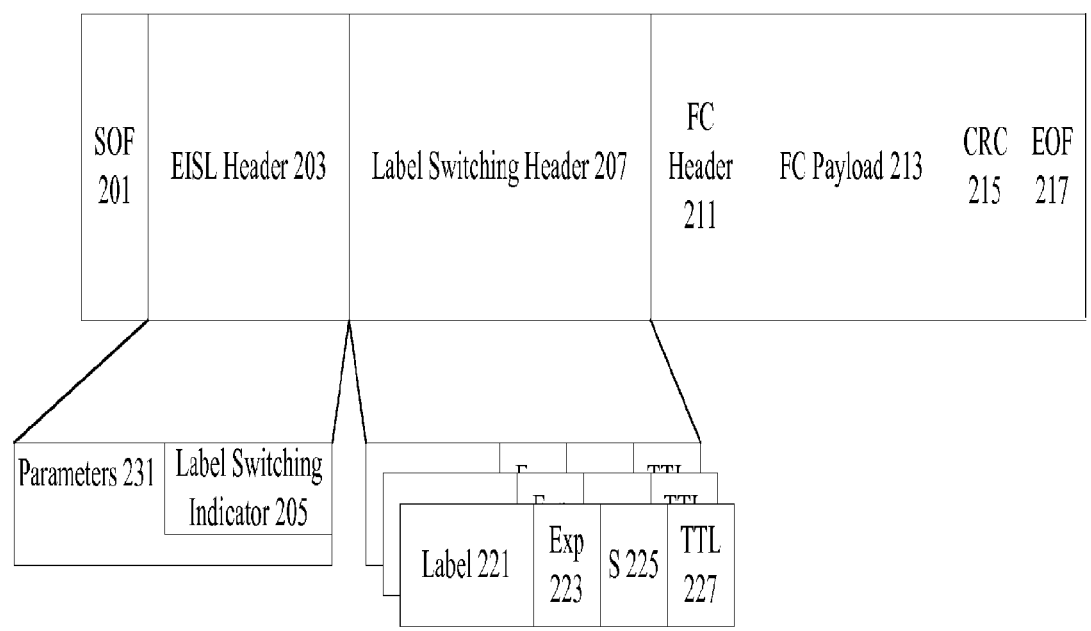
FIG. 2 is a diagrammatic representation of a fibre channel frame supporting label switching.

FIG. 2 is a diagrammatic representation of a frame that can include a label for label switching. According to various embodiments, the label switching header 207 is located between the Extended Inter-switch Links (EISL) header 203 and the fibre channel header 211. The EISL header 203 includes a label switching indicator 205 that provides information on whether a label is provided in the frame.

According to specific embodiments, the label switching header 207 includes a stack of 32-bit words. Each label includes a 20-bit label for accessing an entry in a routing table, a 3-bit experimental field, a 1-bit EOS field, and an 8-bit time-to-live (TTL) field. The label value is used at a label switching router to determine the next hop, the stack bit is used to indicate that the bottom of a stack of labels has been reached. It should be noted that the label switching header can include more than one label. The time-to-live field is decremented at each hop like the time-to-live field in a conventional TCP/IP packet.

Although the label switching header described above is included between an EISL header and a fibre channel header 207, it should be noted that a label switching header can be included in a variety of different fields associated with the frame. For example, a label switching header can be included in a frame that does not include an EISL header 203. In this example, the label switching indicator can be provided in a fibre channel header 211, and label switching information can be included in the fibre channel payload. However, it should be noted that a label switching indicator and label switching information can instead be included in an extended fibre channel header.

Figure 3:
FIG. 3 is a diagrammatic representation of a routing table in a label switching router.

FIG. 3 is a diagrammatic representation of a label information base (LIB). In the example shown, label switching information and routing table information is maintained in the same entity. However, a routing table and label switching information can be maintained in separate entities. An entity including label switching information is referred to herein as a label information base (LIB). Some LIB entities may include only a label information base and no routing table information.

According to various embodiments, a LIB with routing table information includes entries pairing a destination identifier with a next hop. That is, the routing tables include a destination identifier column 303 and a next hop column 305. To support label switching, an in or incoming label column in 301 as well as an out or outgoing label column 307 is included. When a frame is received, a label can be used to access an entry in the routing table corresponding to the label in the frame. In one example, if the label in the frame is 2000, the switch recognizes that the next hop is switch 43 and the out label should be 3000. In this example the destination ID is not used to determine the next hop.

In still other examples, the number of labels to push or pop and a determination of which labels to insert can be made not only using the destination ID, but also by policies that are configured in the switch. Some policies include the port number and source and destination pair. It should be noted that routing tables are provided on a per virtual network basis (virtual storage area network (VSAN) or virtual local area network (VLAN)). That is, a routing table is available for each VSAN/VLAN the label switching router is a part of. A SAN (or a VSAN) may be a network such as an Infiniband network.

A variety of techniques can be used for generating a LIB. In one embodiment, a LIB is generated upon the receipt of link state update packets under the FSPF protocol. According to other embodiments, a LIB is generated upon receiving augmented link state update packets. Link state packets with additional information such as bandwidth availability allowing traffic engineering are referred to herein as augmented link state update packets. A LIB can be generated periodically or upon the identification of a change in link state. According to various embodiments, a newly generated LIB is associated with an incarnation number. A combination of all the incarnation numbers in a fibre channel fabric is herein referred to as a topology version number. Using a topology version number can allow for in order delivery of fibre channel frames. Using a topology version number to allow for in order delivery is described in concurrently filed U.S. patent application Ser. No. 10/114,568 by Maurilio Cometto and Scott S. Lee and titled Methods and Apparatus For Fibre Channel Frame Delivery, the entirety of which is incorporated by reference for all purposes.

In one embodiment, every time a new routing table is generated at a switch, the incarnation number is incremented by one. According to various embodiments, each label switching router in a fibre channel network not only generates new forwarding routes toward each destination, but each label switching router also generates new in labels different from the previous set of in labels.

The augmented link state update packets can be used to generate conventional routing tables and/or LIBs. Packets received at a label switching router can then be routed to a next hop by using labels instead of next hop information in a routing table. Alternatively, packets can be forwarded to a next hop using label information in place of routing table information. Accordingly, label switching routers can be implemented without routing tables entirely. However, augmented link state update packets can also be used to traffic engineer and select routes not found using conventional routing table mechanisms. In one example, a traffic engineered route may forward a received next packet to a different next hop than a routing table would. Furthermore, augmented link state update packets can be used to specify a route from a source to a destination, whereas routing table information can only specify a next hop.

According to various embodiments, a source label switching router determines the best route to a particular destination. The source then sends a frame explicitly routed to each hop between the source and the destination on the selected route. A mechanism such as Resource Reservation Protocol (RSVP-TE) can be used to configure routes. RSVP-TE is described in RFC 3209, the entirety of which is incorporated by reference for all purposes.

Figure 4A:
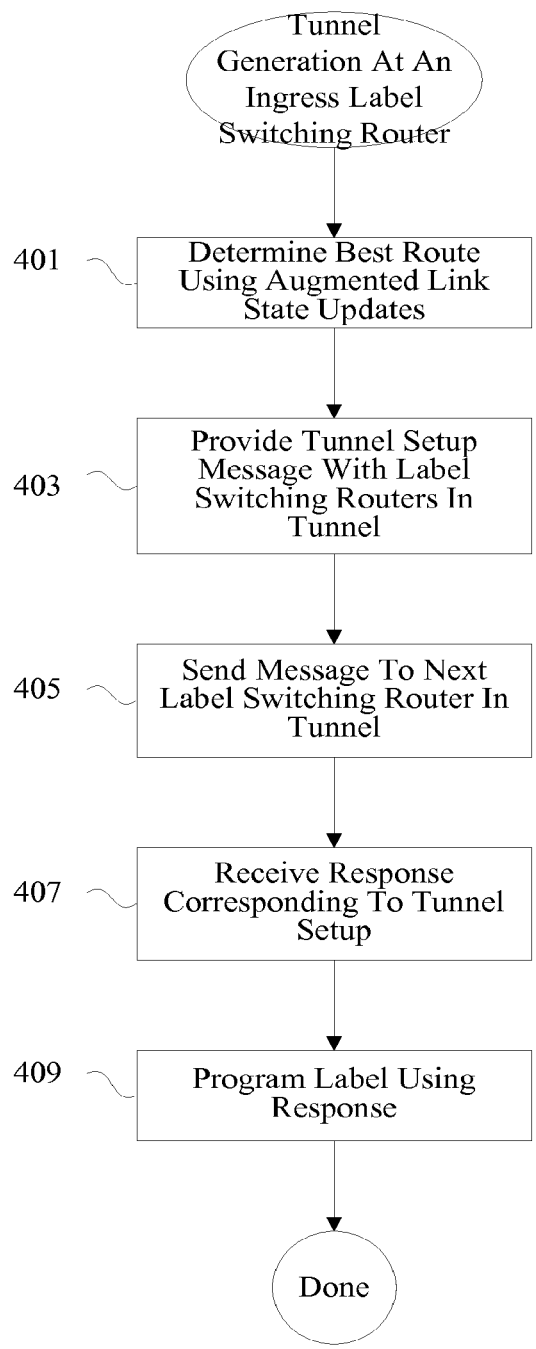
FIG. 4A is a flow process diagram showing generation of a tunnel at an ingress label switching router.

FIG. 4A is a process flow diagram showing the configuration of route using traffic engineering. At 401, the ingress label switching router determines the best route to a destination based on information such as that provided in the augmented link state update packets. The label switching router can also apply other policies for selecting a route. In one example, the label switching router may attempt to avoid certain links. At 403, the ingress label switching router creates a tunnel set up message having information identifying the label switching routers in the tunnel. Any message for configuring label switching routers on a selected route to forward packets along the selected route is referred to herein as a tunnel setup message. At 405, the ingress label switching router sends the message to the next label switching router in the tunnel. It should be noted that the selected route can be a variety of different types of routes and tunnels.

In one example, a tunnel established is a virtual private network or VPN tunnel. In another embodiment the tunnel established is an IP tunnel. At 407, the ingress label switching router receives a response message corresponding to the tunnel set up message sent at 405. According to various embodiments, the response to the tunnel set up message originated from the destination. At 409, the label provided in the response message is programmed into the LIB.

Figure 4B:
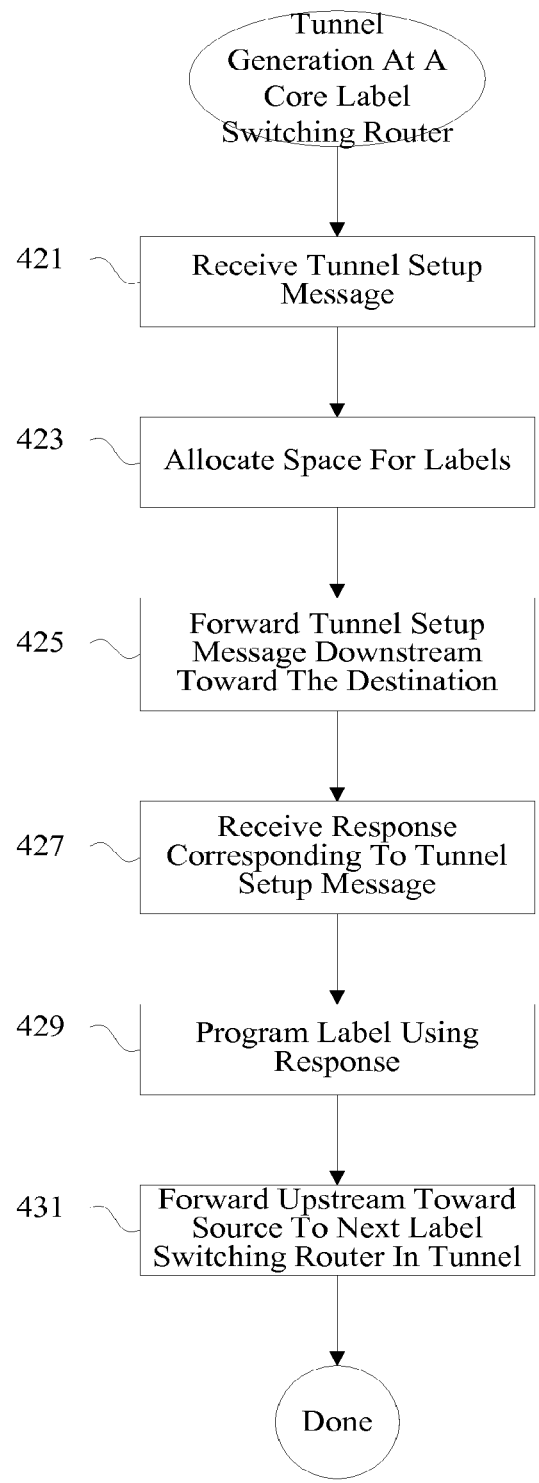
FIG. 4B is a flow process diagram showing generation of a tunnel at a core label switching router.

FIG. 4B is a process flow diagram showing a core label switching router in a tunnel between the source of the destination. At 421, the core label switching router receives a tunnel set up message. At 423, the core label switching router allocates labels associated with the message. At 425, the core label switching router forwards the tunnel set up message downstream to the next label switching router in the tunnel. At 427, the core label switching router receives a response message corresponding to be tunnel set up message and programs the label into the LIB at 429. At 431, the core label switching router forwards the response upstream to the previous hop in the tunnel.

Figure 4C:
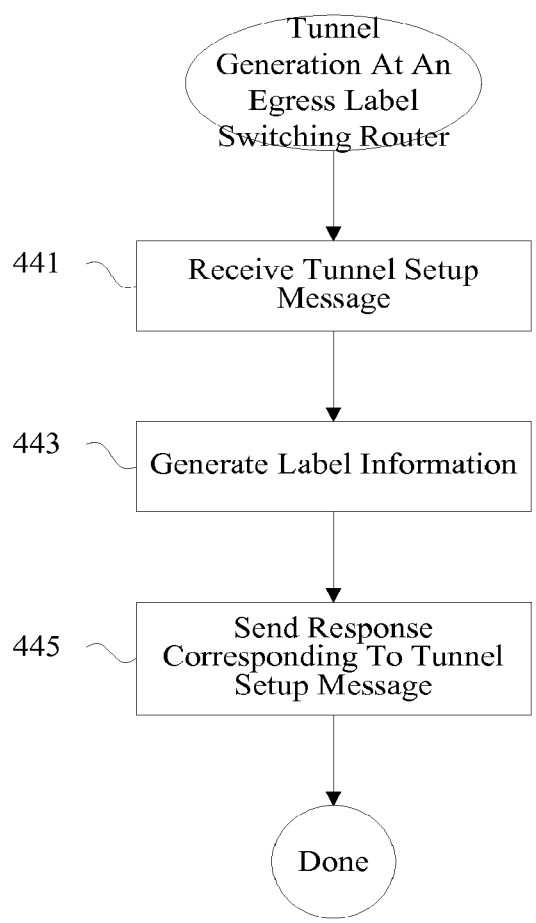
FIG. 4C is a flow process diagram showing generation of a tunnel at an egress label switching router.

FIG. 4C is a process flow diagram showing an egress label switching router. At 441, the egress label switching router receives a tunnel setup message. The destination label switching router generates label information at 443 and sends a response message in the reverse direction along the same selected route at 445.

Figure 5A:
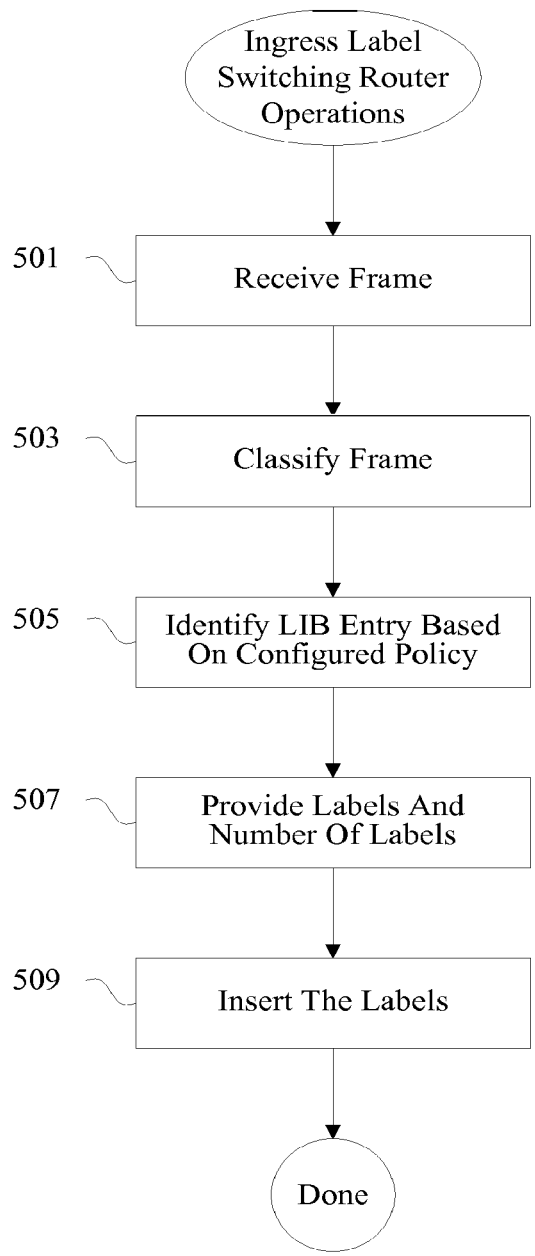
FIG. 5A is a flow process diagram showing ingress label switching router operations.

Once a tunnel is established, label switching operations may vary based on whether a label switch is an ingress label switching router, a core label switching router, or an egress label switching router. FIG. 5A is a flow process diagram showing one example of label push operations at an ingress label switching router. According to various embodiments, an ingress label switching router receives a frame at 501 from a label unaware node. At 503, the ingress label switching router classifies the frame. At 505, the ingress label switching router identifies the LIB entry corresponding to the classified frame. In one embodiment, an input or output port identified may be used to select a LIB entry.

At 507, the number of labels and the labels to be pushed onto the label stack are determined. Any mechanism for holding labels and information associated with labels is referred to herein as a label stack. A label stack can be a stack, a linked list, an array, or any structure containing label information. The frame is then modified at 509 to include the one or more labels. Modifying the frame can include updating an EISL header to show that a label is available and placing the label information into a label header.

Figure 5B:
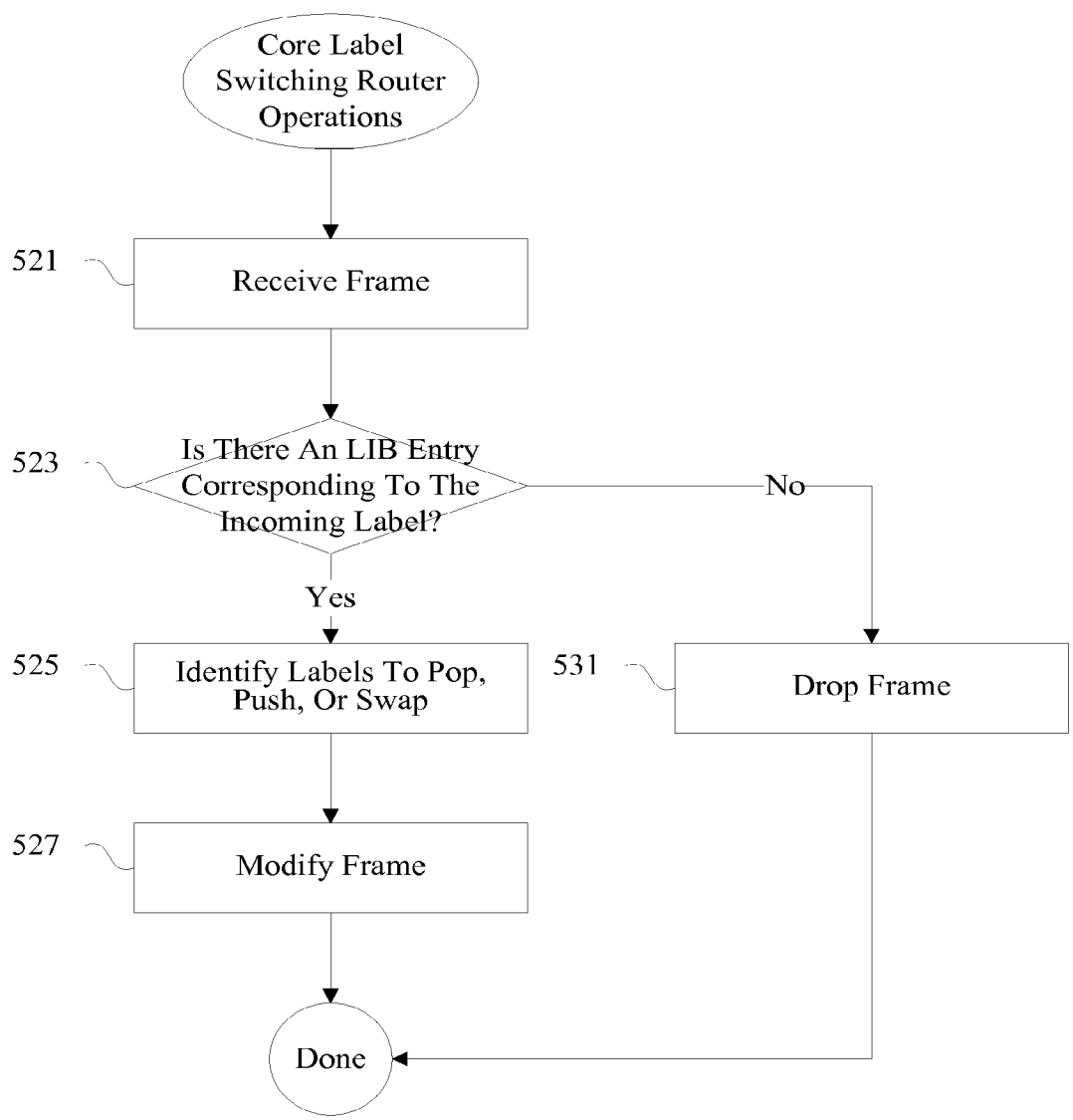
FIG. 5B is a flow process diagram showing core label switching router operations.

FIG. 5B is a flow process diagram showing one example of core label switching router operations. As noted above, a core label switching router receives frames from a label switching enabled router. At 521, a core label switching router receives a frame. At 523, it is determined if an LIB entry corresponds to the incoming label associated with the frame. If no entry corresponds, the frame is dropped at 531. According to various embodiments, various error reporting and notification operations can also be performed. Although it may be possible to route the frame based on a routing table next hop, the frame is dropped in various embodiments in order to limit the chance of a loop in the network. At 525, the labels to be popped, pushed, or swapped are determined based on the LIB entry. At 527, the frame is modified to add, remove, or replace label information.

Figure 5C:
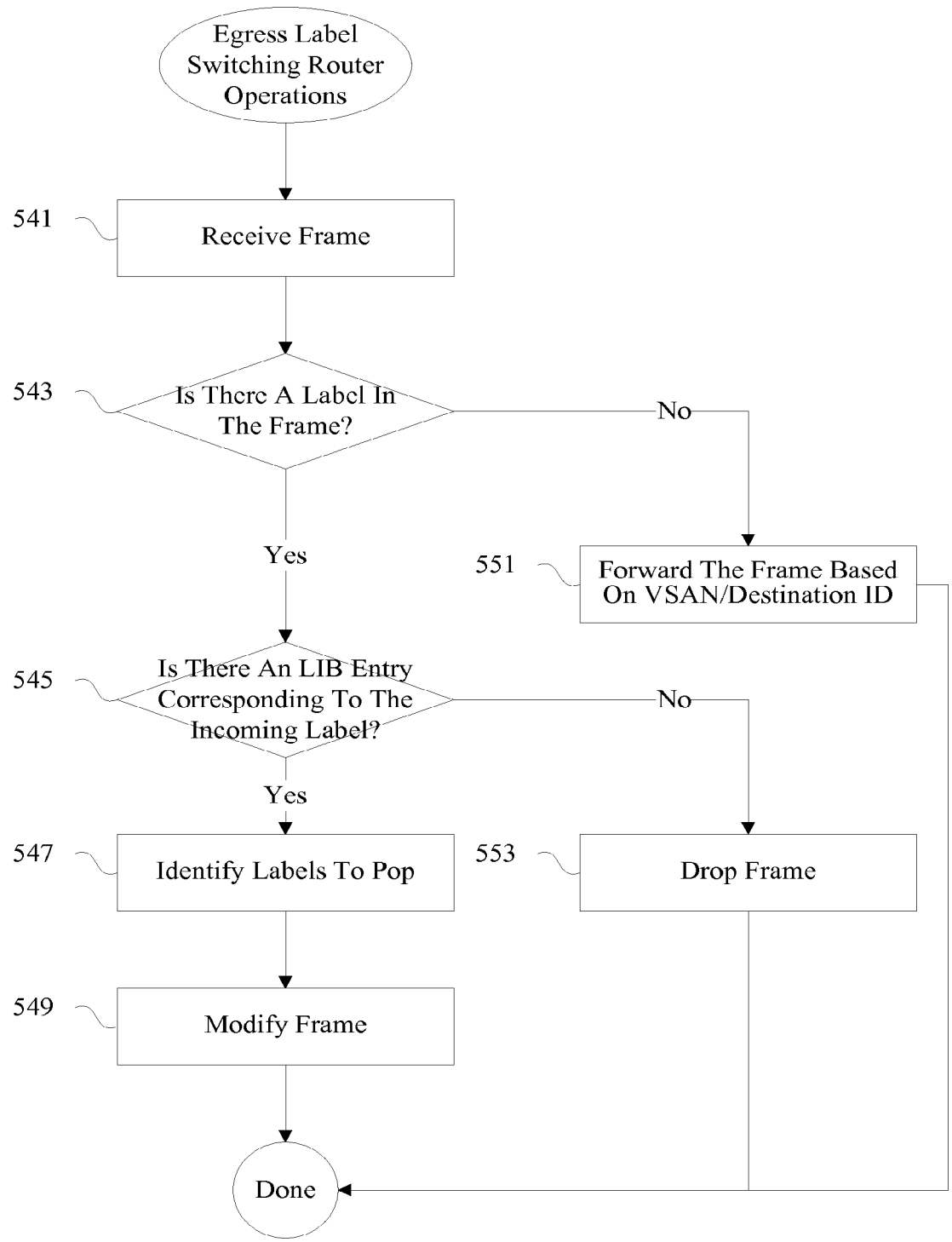
FIG. 5C is a flow process diagram showing egress label switching router operations.

FIG. 5C is a flow process diagram showing one example of egress label switching router operations. At 541, the egress label switching router receives a frame from a label switching enabled router. It is determined at 543 whether a label exists in the packet. If no label exists, the packet is forwarded based on VSAN and destination ID. If a label exists, it is determined whether an LIB entry corresponds to the incoming label at 545. If no LIB entry corresponds to the label at 545, the frame is dropped at 553. Otherwise, the number of labels to pop is determined at 547. The frame is then modified at 549.

Figure 6:
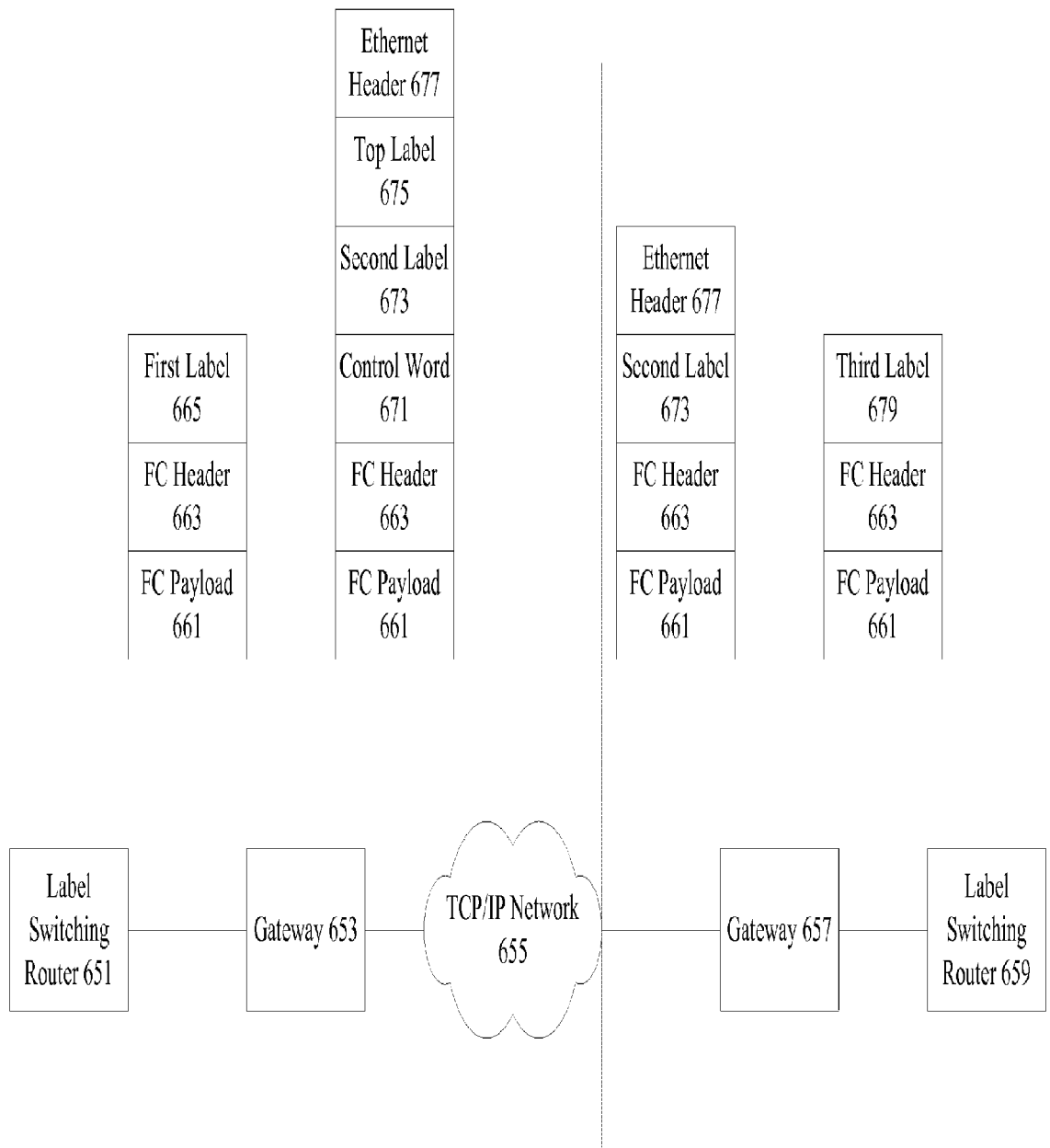
FIG. 6 is a diagrammatic representation showing tunneling using label switching.

FIG. 6 is a diagrammatic representation showing tunneling through a TCP/IP network 655 the does not support fibre channel frames. The label switching router 651 provides a frame to gateway 653. The frame includes a first label 665, the fibre channel header 663, and a fibre channel payload 661. According to various embodiments, the frame may not include a first label 665. The gateway 653 recognizes that it is about to forward a labeled fibre channel frame through a TCP/IP network 655 that does not support fibre channel frames. The fibre channel gateway 653 uses a frame including a top label 675, an ethernet header 677, and a second label 673. The top label is used to pass traffic from gateway 653 to gateway 657 and the bottom label is used to forward the traffic to label switching router 659 after the frame reaches gateway 657. The top label is determined by forwarding mechanisms in the TCP/IP network 655 while the second label is determined by forwarding mechanisms in the fibre channel network.

According to various embodiments, the label switching routers in the TCP/IP network 655 only operate on the topmost label 675 and do not need to access any other labels in the label stack. Accordingly, the entities in the TCP/IP network 655 do not need to be aware that the fibre channel frame is being tunneled through the TCP/IP network 655. Instead, the TCP/IP network entities merely forward frames through the network based on the topmost label.

Unlike conventional TCP/IP networks, fibre channel frames cannot be delivered out of sequence. Accordingly, a control word 671 including a sequence number is included after the label stack, or beneath second label 673, so that the gateway 657 can detect packets arriving out of sequence. It should be noted that a control word can be included in different fields in the fibre channel frame, such as in the fibre channel header. Any mechanism allowing a fibre channel gateway to detect out of order fibre channel frames after transmission through a non fibre channel network is referred to herein as a control word.

Also unlike conventional TCP/IP networks, fibre channel network frames are typically not allowed to be dropped for performance reasons. Techniques of the present invention contemplates a gateway 657 detecting that frames from gateway 653 were dropped and requesting retransmission in order to provide for efficient frame delivery. It should be noted that by tunneling using labels, security can also be provided by using network protocols such as Virtual Private Network or VPN.

Figure 7:
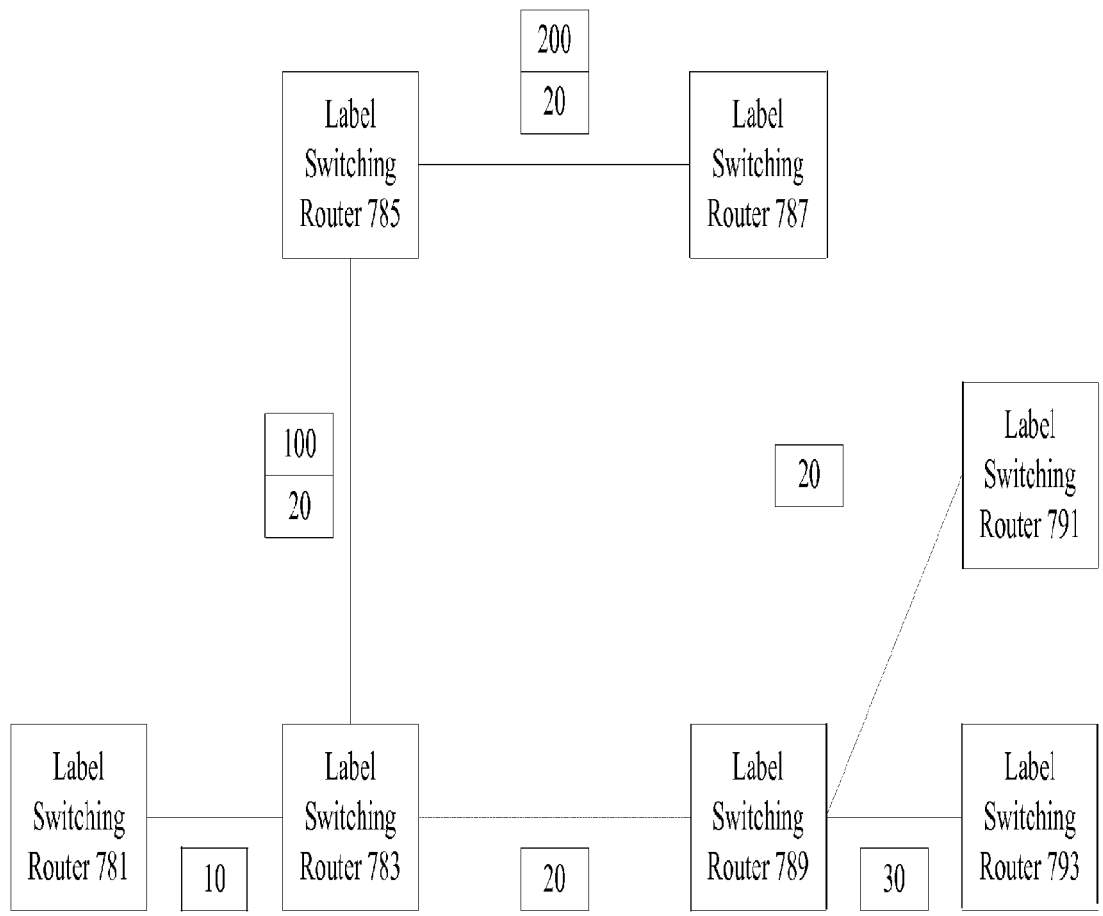
FIG. 7 is a diagrammatic representation showing traffic engineering using label switching.

FIG. 7 is a diagrammatic representation showing fast link failover, according to various embodiments. A label switching router 783 receiving a frame from label switching router 781 can recognize that a link between router 783 and router 789 is down even though the routing table instructs router 783 to forward the frame directly to router 789 through the downed link. Instead of waiting for conventional link state update and link state record techniques to update routing tables, labels can be used to more quickly reroute traffic around the downed link. According to various embodiments, an additional label is pushed onto the label stack associated with the frame to forward the frame to a label switching router 785. The label switching router 785 uses the top label with the value of 100 to determine that the frame should be forwarded to a label switching router 787. The top label is then replaced with the value of 200. A label switching router 787 then removes the incoming label 200 and forwards the frame based on the second label with the value of 20 to label switching router 789.

The downed link between label switching router 783 and label switching router 789 is bypassed. It should be noted that traffic engineering using label switching can be implemented in a variety of different manners. In one example, a system administrator can manually set up alternative routes at a label switching router 783. A switch 783 is manually configured to replace a label stack with a value of 10 with a label stack with a top label value of 100 and a second label value of 20. Link state information can also be passed into the network automatically.

Although the techniques of the present invention can be used to provide features such as fast failover, explicit source routing, and traffic engineering as noted above, the techniques of the present invention can also be used to provide for in order delivery.

Figure 8:
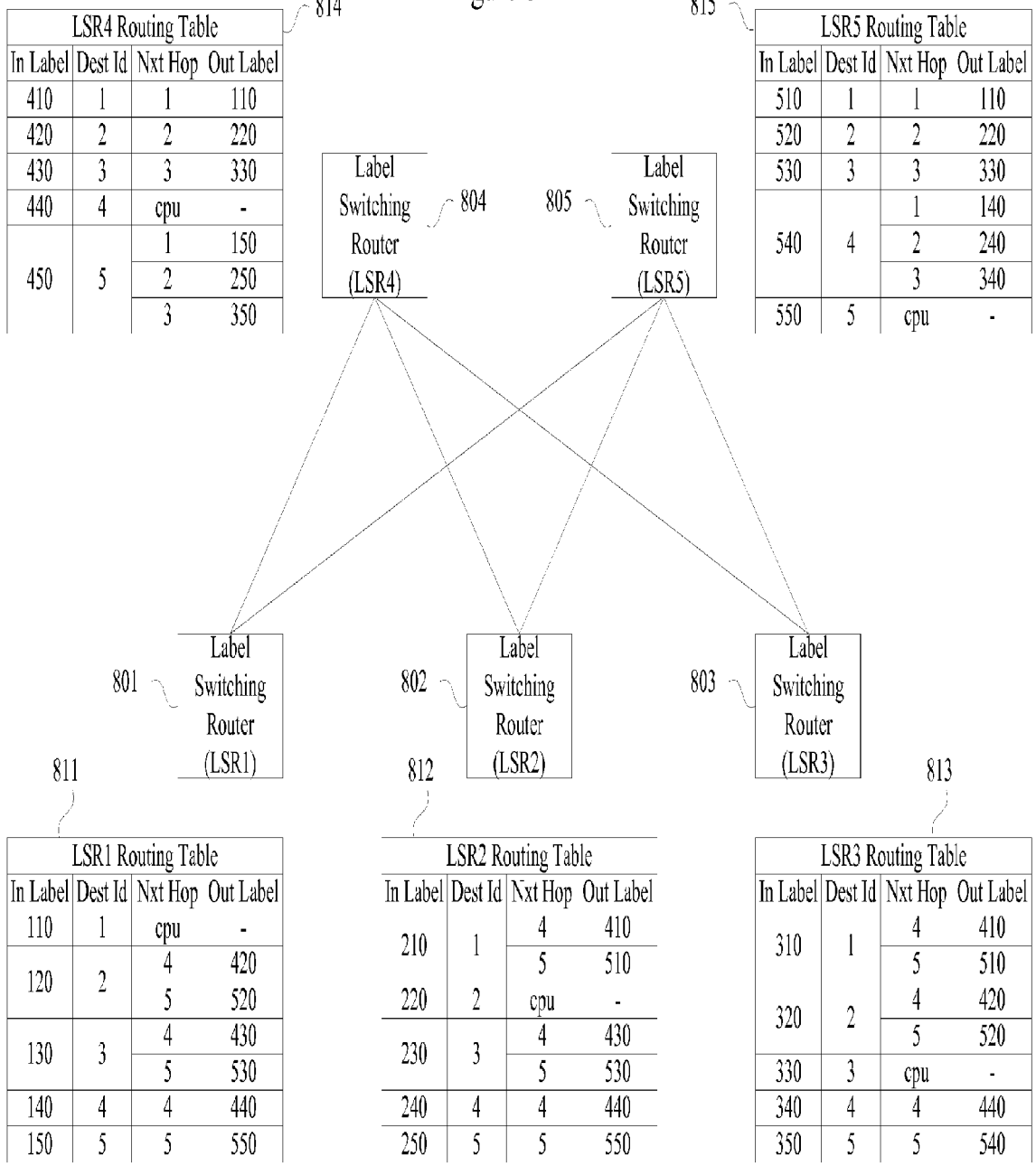
FIG. 8 is a diagrammatic representation of one example of a fibre channel network that supports in order delivery.

FIG. 8 is a diagrammatic representation of one example of a fibre channel network that supports in order delivery. In order delivery is described in concurrently filed U.S. patent application Ser. No. 10/114,568 by Maurilio Cometto and Scott S. Lee and titled Methods and Apparatus For Fibre Channel Frame Delivery, the entirety of which is incorporated by reference for all purposes.

In addition to containing the destination address, a frame includes as a destination identifier an input label that allows a switch to quickly access an entry in a routing table. For example, a label switching router 804 can receive a frame with a destination of 2 and an in label of 420. The label switching router 804 can access its routing table 814 to recognize that the next hop is label switching router 802 and the output should be 220. According to various embodiments, the label switching router 804 replaces the frame label value of 420 corresponding to the in label in the routing table with a frame label of 220 corresponding to the out label in the routing table 814.

By replacing the label value, the label switching router 804 provides label information to the next hop router 802, to allow the label switching router 802 to similarly access a routing table entry quickly. It should be noted that although label switching can be provided for fast access of entries in a routing table, label switching can be used for a variety of reasons. The techniques of the present invention provide that frames can be delivered in order by using labels.

When a label switching router 802 receives a frame from label switching router 804, the label switching router uses the label 220 to access an entry in the routing table 812. Using the in label 220, the label switching router 802 recognizes that the frame no longer needs to be forwarded, as the frame has actually arrived at its destination.

As described above, label switching may be performed in a variety of network devices. According to various embodiments, the switch includes a processor, network interfaces, and memory for maintaining LIBs. A variety of input and output ports, Media Access Control (MAC) blocks, and buffers can also be provided as will be appreciated by one of skill in the art.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method comprising:
  receiving augmented link state update information at an ingress fibre channel label switching router in a fibre channel network;
  using the augmented link state update information, selecting a route from the ingress fibre channel label switching router to an egress fibre channel label switching router in the fibre channel network, the route comprising a plurality of core fibre channel label switching routers in the fibre channel network and the egress fibre channel label switching router; and generating a tunnel setup message having information identifying the plurality of core fibre channel label switching routers in the route.

2. The method of claim 1, further comprising:
forwarding the tunnel setup message along the route.

3. The method of claim 2, further comprising:
receiving a response corresponding to the tunnel setup message, the response including label information.

4. The method of claim 3, further comprising:
programming the label information into a label information base associated with the ingress fibre channel label switching router.

5. A system comprising:
a processor; and
a memory having stored therein instructions which, when executed by the processor, cause the processor to perform operations comprising:
receiving augmented link state update information via the system, the system comprising an ingress fibre channel label switching router in a fibre channel network;
selecting a route from the ingress fibre channel label switching router to an egress fibre channel label switching router in the fibre channel network, the route comprising a plurality of core fibre channel label switching routers in the fibre channel network and the egress fibre channel label switching router, the route being selected based on the augmented link state update information; and
generating a tunnel setup message having information identifying the plurality of core fibre channel label switching routers in the route.

6. The system of claim 5, the memory storing additional instructions which, when executed by the processor, result in an operation comprising forwarding the tunnel setup message along the route.

7. The system of claim 5, the memory storing additional instructions which, when executed by the processor, result in an operation comprising receiving a response corresponding to the tunnel setup message, the response including label information.

8. The system of claim 5, wherein the memory additionally stores a label information base having label information associated with the ingress fibre channel label switching router.

9. A method comprising:
receiving a fibre channel frame at a first gateway connecting a fibre channel network to a second network that does not support fibre channel frames;
identifying an incoming label associated with the fibre channel frame;
identifying an outgoing label for forwarding the fibre channel frame, the outgoing label determined by referencing an entry in the label information base associated with the first gateway;
inserting the outgoing label to the fibre channel frame;
inserting additional labels into the fibre channel frame to establish a tunnel between the first gateway and a second gateway, the additional labels used to forward the fibre channel frame, via the tunnel, to the second gateway through the second network that does not support fibre channel frames; and
forwarding the fibre channel frame to a next hop, wherein the next hop uses the outgoing label to route the fibre channel frame.

10. The method of claim 9, wherein at least one of the first gateway or the second gateway comprises a fibre channel switch.

11. The method of claim 9, wherein a plurality of labels for forwarding the fibre channel frame are added to the fibre channel frame.

12. The method of claim 9, further comprising:
inserting a control word into the fibre channel frame, the control word used to reorder frames received out of order at the second gateway.

13. The method of claim 9, wherein the additional labels correspond to entries in a label information base of the second network.

14. The method of claim 9, wherein the second gateway connects the second network to another fibre channel network, and wherein the second network comprises an IP network.

15. The method of claim 12, wherein the second gateway removes the control word from the fibre channel frame.

16. The method of claim 9, wherein the first gateway receives a tunnel setup message prior to establishing the tunnel between the first gateway and the second gateway.

17. A system, comprising:
a processor; and
a computer-readable storage medium having stored therein instructions which, when executed by the processor, cause the processor to perform operations comprising:
receiving a fibre channel frame by the system, the system comprising a first gateway connecting a fibre channel network to a second network that does not support fibre channel frames;
identifying an outgoing label for forwarding the fibre channel frame, the outgoing label determined by referencing an entry in the label information base associated with the first gateway;
inserting the outgoing label to the fibre channel frame;
inserting additional labels into the fibre channel frame to establish a tunnel between the first gateway and a second gateway, the additional labels used to forward the fibre channel frame, via the tunnel, to the second gateway through the second network that does not support fibre channel frames; and
forwarding the fibre channel frame to a next hop, wherein the next hop uses the outgoing label to route the fibre channel frame.

18. The system of claim 17, wherein the additional labels correspond to entries in a label information base of the second network.

19. The system of claim 17, further comprising inserting a control word into the fibre channel frame, the control word used to reorder frames received out of order at the second gateway.

20. The system of claim 17, wherein the second gateway removes the control word from the fibre channel frame.

* * * * *